United States Patent
Berdichevsky et al.

(10) Patent No.: US 7,433,794 B1
(45) Date of Patent: Oct. 7, 2008

(54) MITIGATION OF PROPAGATION OF THERMAL RUNAWAY IN A MULTI-CELL BATTERY PACK

(75) Inventors: Eugene Michael Berdichevsky, Palo Alto, CA (US); Philip David Cole, Redwood City, CA (US); Arthur Joseph Hebert, San Carlos, CA (US); Weston Arthur Hermann, Palo Alto, CA (US); Kurt Russell Kelty, Palo Alto, CA (US); Scott Ira Kohn, Menlo Park, CA (US); David Frederick Lyons, Palo Alto, CA (US); Jeffrey Brian Straubel, Menlo Park, CA (US); Noel Jason Mendez, Mountain View, CA (US)

(73) Assignee: Tesla Motors, Inc., San Carlos, CA (US)

( * ) Notice: Subject to any disclaimer, the term of this patent is extended or adjusted under 35 U.S.C. 154(b) by 0 days.

(21) Appl. No.: 11/779,654

(22) Filed: Jul. 18, 2007

(51) Int. Cl.
*G06F 19/00* (2006.01)
*H02J 7/00* (2006.01)

(52) U.S. Cl. .................... 702/130; 702/63; 320/150

(58) Field of Classification Search ................. 320/127, 320/150, 151, 152, 153; 702/63, 130, 132
See application file for complete search history.

(56) References Cited

U.S. PATENT DOCUMENTS

| | | | | |
|---|---|---|---|---|
| 4,633,418 A | * | 12/1986 | Bishop | 702/63 |
| 5,945,803 A | * | 8/1999 | Brotto et al. | 320/106 |
| 6,294,897 B1 | * | 9/2001 | Champlin | 320/153 |

* cited by examiner

*Primary Examiner*—John E. Barlow, Jr.
*Assistant Examiner*—Douglas N Washburn
(74) *Attorney, Agent, or Firm*—Raggio & Dinnin, P.C.

(57) ABSTRACT

A method of mitigating propagation of a thermal event in an energy storage system having a plurality of cells is disclosed. The method includes the steps of identifying the heat sources within the energy storage system and plurality of cells. The method then controls a temperature of the energy storage system and plurality of cells and also detects predetermined conditions within the energy storage system. The method then performs a predetermined action based on when one of the predetermined conditions is detected. A plurality of sensors and switches along with associated hardware or software will be used to control the temperature of the energy storage system upon detection of predetermined conditions involving overheating, over current, over voltage of the like.

35 Claims, 4 Drawing Sheets

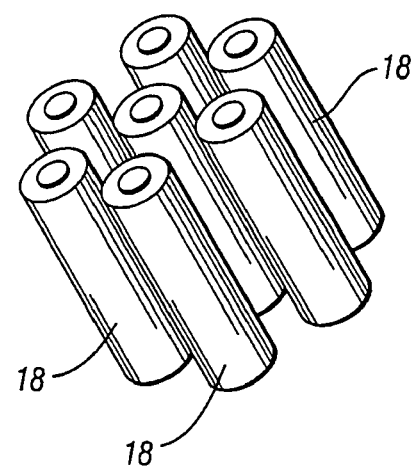
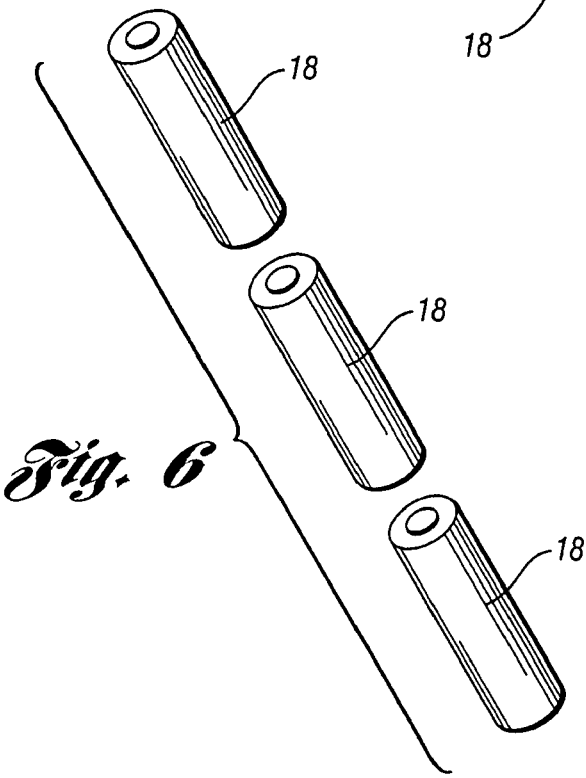
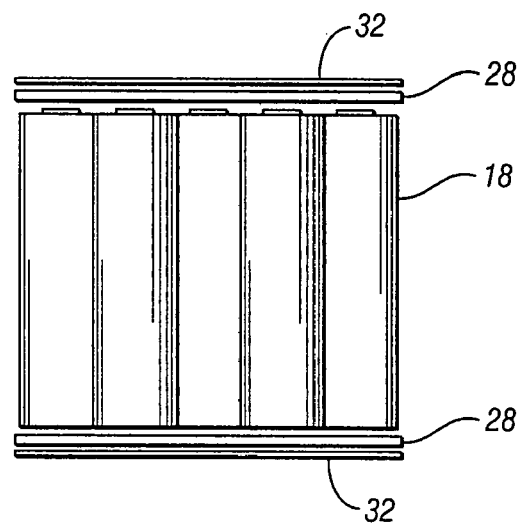

MITIGATION OF PROPAGATION OF THERMAL RUNAWAY IN A MULTI-CELL BATTERY PACK

BACKGROUND OF THE INVENTION

1. Field of the Invention

The subject invention generally relates to mitigation of a thermal runaway event and more particularly relates to the mitigation of propagation of a thermal runaway event in a multi-cell battery pack for use in an electric vehicle.

2. Description of Related Art

It is well known in the prior art to use all electric vehicles to provide transportation for occupants. Many of these prior art electric vehicles carry several thousand pounds of nickel metal hydride batteries to achieve a long range electric vehicle for everyday use by consumers. Furthermore, many of these prior art electric vehicles need to be physically large and heavy to accommodate all of these batteries, such that these vehicles are not capable of achieving necessary acceleration, handling, performance and the extended range needed for an electric vehicle to become a feasible option for public purchase and use. Many prior art electric vehicles that were of normal size and not overly heavy, would have a very small range, thus reducing the feasibility for large mass selling of such vehicles to the consuming public. Furthermore, many of these prior art electrical vehicles which use such batteries had problems with protecting the occupants in the vehicle from the high voltage components and high temperatures that emanated from such high voltage components and still provide a vehicle that moves at a acceptable speeds compared to that of a gasoline or diesel internal combustion engine equipped vehicle. Some of these prior art electrical vehicles have had problems with their batteries overheating, thus reducing the range of the electrical vehicle and the durability and overall life of the batteries or cells that are part of the battery pack systems within the prior art electric vehicle.

Generally, batteries or cells are arranged within many prior art vehicles that operate with high power output which increases the temperature and hence may reduce longevity of the prior art batteries. The use of the heavy and high voltage battery systems in prior art electrical vehicles requires a lot of maintenance to keep the batteries operating due to the high temperatures at which the battery pack systems tend to operate. Some of these prior art systems try to increase the longevity of the batteries by using air cooled systems that blow cooled air over the batteries to try to remove heat from the battery compartment and batteries in these prior art electric vehicles. However, many of these prior art heat reduction systems for the batteries are not very efficient and do not provide an efficient system for balancing and removing heat or adding heat to the batteries. Hence, many prior art systems may suffer from overheating or overcooling, thus reducing the durability and longevity of the batteries and hence the range of the electric vehicle. Furthermore, in some of these prior art vehicles if one battery cell got too hot it would propagate and lead to a thermal runaway of the entire battery pack and all of the batteries therein, thus greatly reducing the longevity and the ability of the cells to hold a charge or completely destroying the battery pack. This would result in a full replacement of the battery pack and down time for the electric vehicle thus effecting the overall feasibility for selling such electric vehicles to the consuming public.

Therefore, there is a need in the art for an improved system to mitigate propagation of a thermal runaway event for use in a battery pack of an electric vehicle. There also is a need in the art for a methodology and system that will maximize the longevity and performance of the battery pack by reducing the impact of an overheating cell within a battery pack. There also is a need in the art for a system that will mitigate any thermal runaway with a variety of systems thus increasing the chances that an overheating cell will not affect any adjacent cells and/or the entire battery pack or energy storage system. There also is a need in the art for a system of mitigating thermal runaway that will actively and passively cool the cells in an energy storage system. There also is a need in the art for a mitigation system to prevent thermal runaway in a multi-cell battery pack that is capable of sensing a plurality of overheating situations and activating necessary controls to thwart the overheating and minimize the ability of a thermal runaway propagation event to take place within the battery pack.

SUMMARY OF THE INVENTION

One object of the present invention may be to provide an improved system to mitigate the propagation of a thermal runaway cell in a multi-cell battery pack.

Another object of the present invention may be to provide a system of mitigating thermal runaway in a multi-cell battery pack for use in an electric vehicle.

Still another object of the present invention may be to provide a system of mitigating the propagation of thermal runaway that will maximize the longevity, efficiency and power extracted from an energy storage system.

Still another object of the present invention may be to provide a system for mitigating thermal runaway in a battery pack that may help to thermally balance the cells from the energy storage system while also increasing the thermal mass thus slowing the temperature rise of the battery pack versus that of prior art systems.

Yet another object of the present invention may be to provide a system of mitigating the propagation of a thermal runaway cell by having a cooling mechanism that is continuously capable of either adding heat or removing heat in a cooling manner from an energy storage system.

Still another object of the present invention may be to provide a system for mitigation of a thermal runaway cell that is capable of sensing a variety of overheating events within an energy storage system and performing predetermined operations to counteract such overheating events.

Still another object of the present invention may be to provide a mitigation system that both actively and passively cools the energy storage system to help prevent propagation of an overheating or thermal runaway event therein.

To achieve the foregoing and other objects, a methodology of mitigating propagation of a thermal event in an energy storage system having a plurality of cells is disclosed. The methodology includes the steps of identifying heat sources within the energy storage system and plurality of cells. The method also includes controlling the temperature of the energy storage system and the plurality of cells while also detecting predetermined conditions in the energy storage system. The methodology also performs a predetermined action when one of the predetermined conditions is detected to ensure an overheating cell does not propagate to adjacent cells thereby creating a thermal runaway event and/or mass failure of a battery pack or cell. The system may include a plurality of components to counteract such overheating such as a cooling system both active and passive, a plurality of sensors arranged within the energy storage system and battery monitoring voltage devices and current devices to determine if overheating is about to occur in any one predetermined cell.

One advantage of the present invention may be that it provides a novel and improved system for mitigation of a thermal runaway event in a multi-cell battery pack.

Still a further advantage of the present invention may be that it provides a system for mitigation of a thermal runaway event for use in an electric vehicle.

Yet another advantage of the present invention may be that it provides a system for mitigation of propagation of a thermal runaway event in a multi-cell battery pack that slows the temperature rise within the battery pack and hence increases the range and performance of the vehicle.

Still another advantage of the present invention may be that it provides a method of maximizing the longevity of the battery pack by thermally managing the cooling and heating of the battery pack.

Yet another advantage of the present invention may be that it provides a system for mitigating the propagation of a thermal runaway event that includes a plurality of sensors and passive and active cooling systems to ensure an overheating cell does not propagate to adjacent cells.

Yet another advantage of the present invention may be that it provides a system for mitigating propagation of a thermal runaway event by having the capability of detaching or isolating overheating cells that have over voltages, under voltages, over current or under current from the other cells of the battery pack.

Still another advantage of the present invention may be that it provides for a way of thermally balancing the cells of the battery pack thus maximizing the longevity, efficiency and power that can be extracted from the energy storage system for the electric vehicle.

Other objects, features and advantages of the present invention will become apparent from the subsequent description and the appended claims, taken in conjunction with the accompanying drawings.

BRIEF DESCRIPTION OF THE DRAWINGS

FIG. 5 shows normal operating cells oriented transversely relative to a hot cell in the middle.

FIG. 6 shows normal cells oriented axially relative to a hot cell in the middle.

FIG. 7 shows an insulator arranged around each end of a plurality of cells of a battery pack.

BRIEF DESCRIPTION OF THE EMBODIMENT(S)

Figure 1:
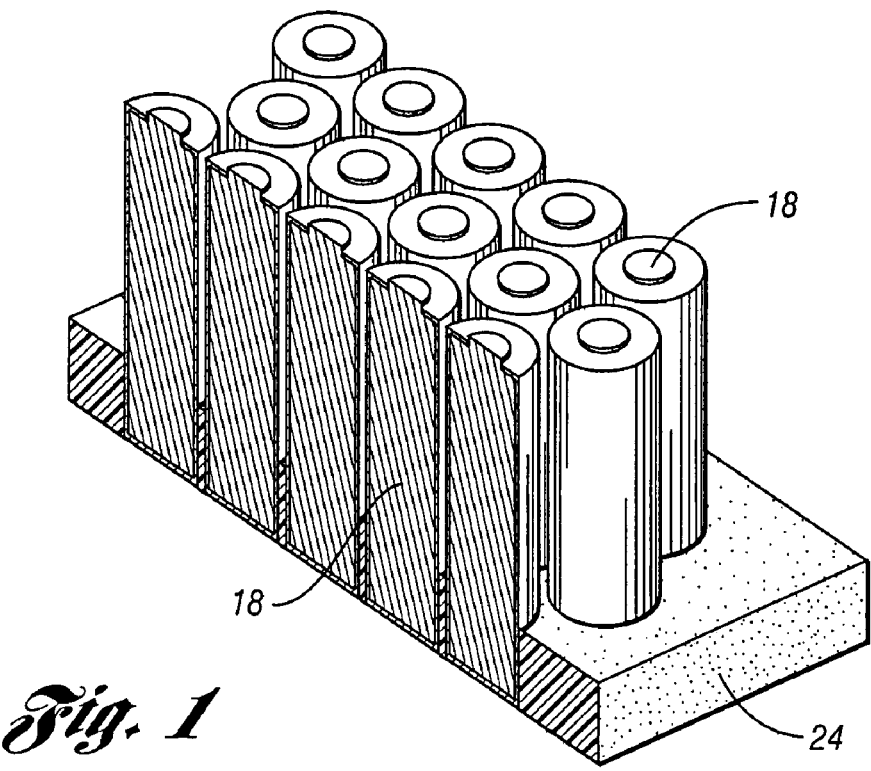
FIG. 1 shows a thermally conductive compound used to fill space between the cells in a battery pack.
Figure 2:
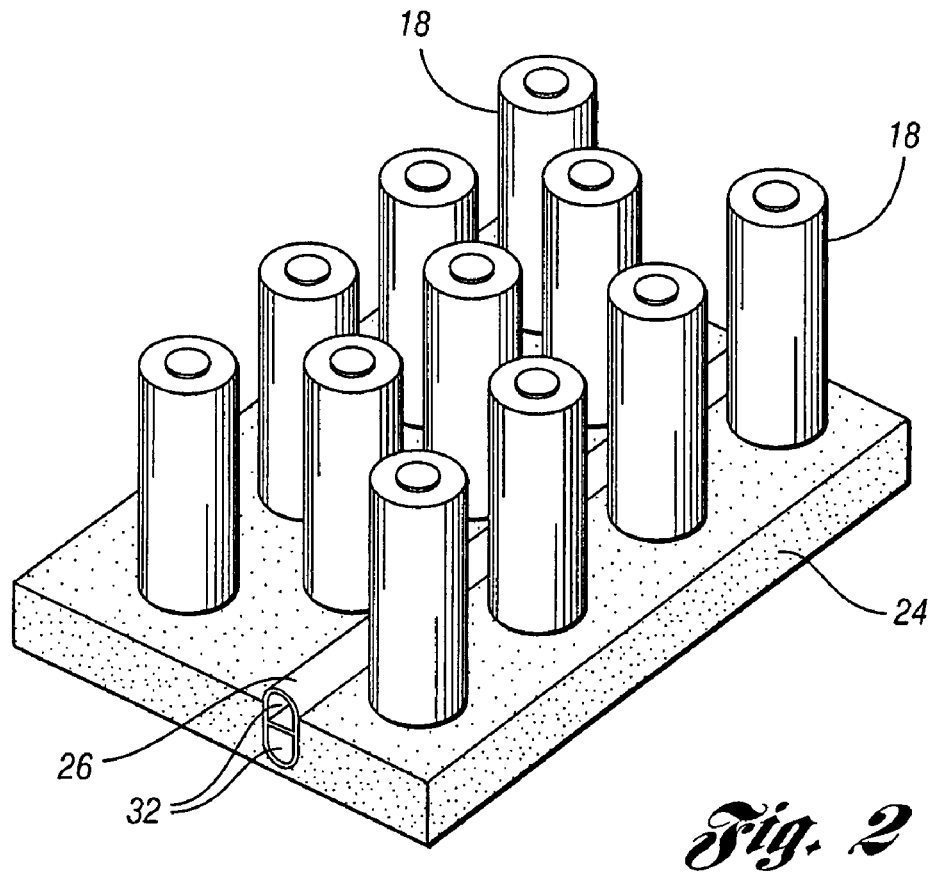
FIG. 2 shows an aluminum cooling tube potted in with the cells of a battery pack.
Figure 3A:
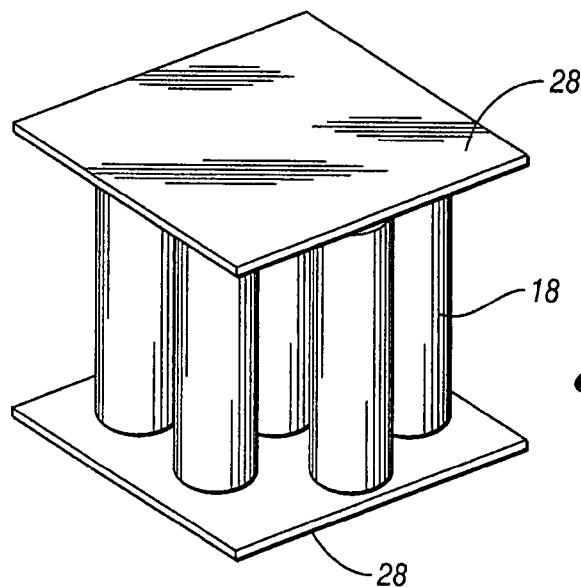
FIGS. 3 A-B show metal collector plates arranged on each end of the cells of a battery pack.
Figure 3B:
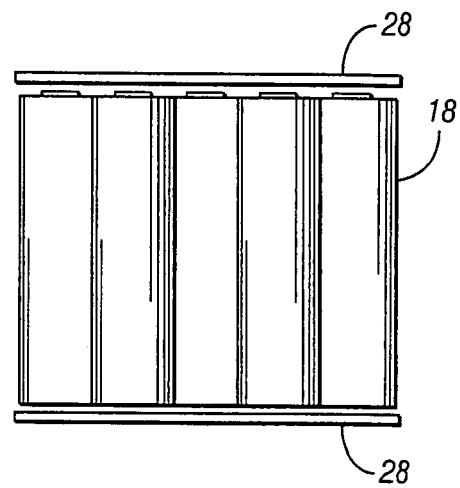
Figure 4:
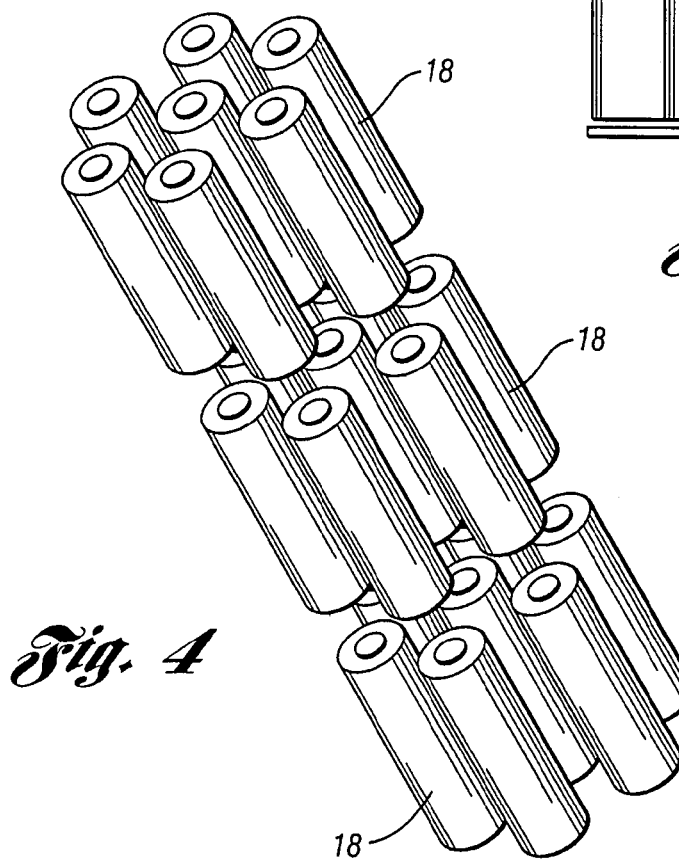
FIG. 4 shows the cells arranged in an array in space.
Figure 8:
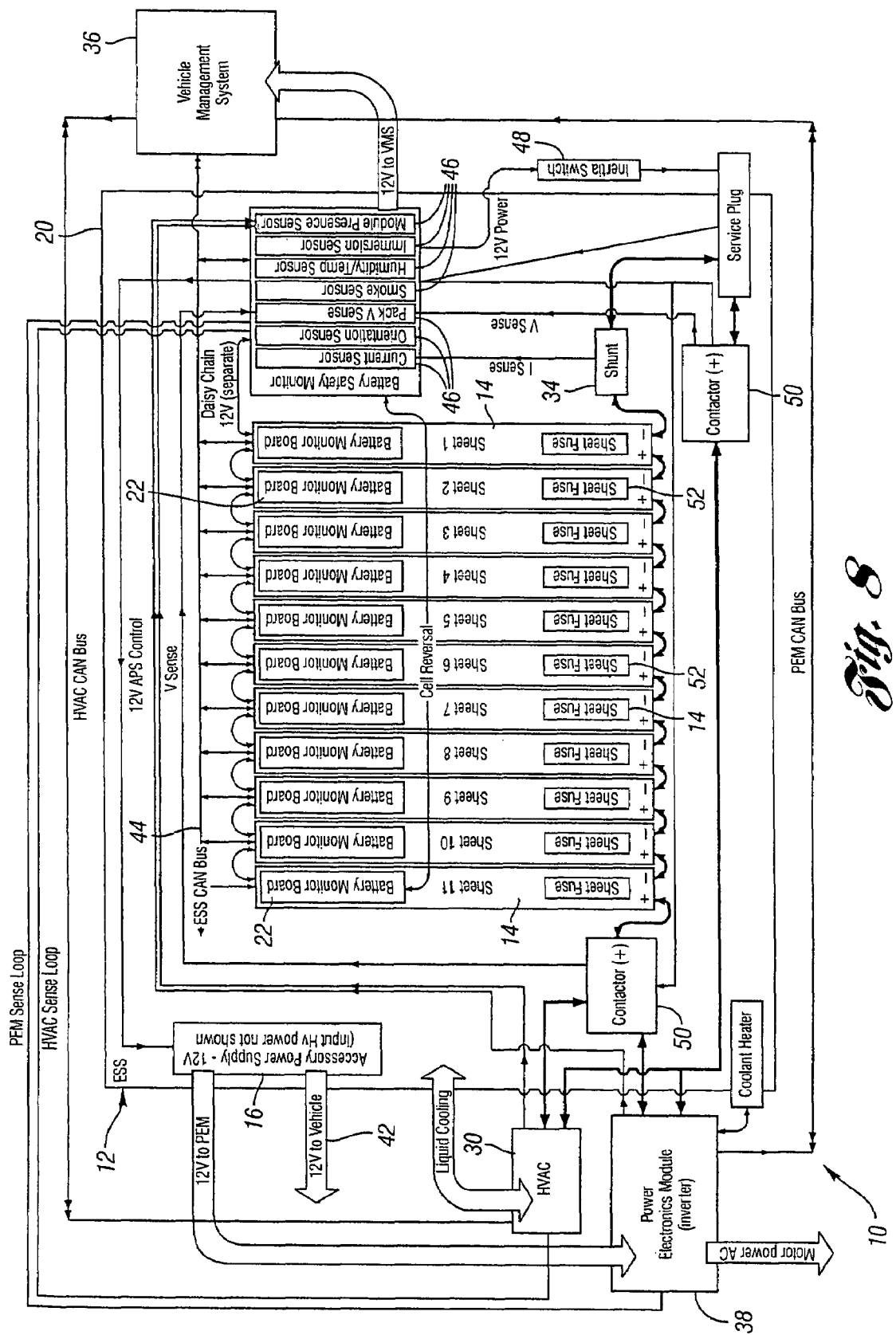
FIG. 8 shows a diagram of a system for mitigation of propagation of a thermal runaway event within an energy storage system according to the present invention.

Referring to the drawings, a system 10 for mitigation of propagation of a thermal runaway event in a multi-cell battery pack for use in an energy storage system (ESS) 12 is shown. The energy storage system or battery pack 12 is generally comprised of a predetermined number of battery modules or sheets 14, a main control and logic PSB and a twelve volt power supply 16. In one contemplated embodiment the energy storage system 12 will have eleven battery modules or sheets 14 which are capable of producing approximately 375 volts DC. This nominal voltage will operate an electric vehicle that may be capable of traveling many miles without recharging and is capable of delivering enough power and acceleration for everyday driving use. In one contemplated embodiment the ESS 12 may be capable of storing enough energy that the electric vehicle may travel approximately 200 miles or more without recharging. However, it should be noted that it is also contemplated that the electric vehicle based on the present invention can travel well over 200 miles without recharging. It is also contemplated in one embodiment that the electric vehicle using the energy storage system 12 of the present invention will be capable of accelerating from zero to sixty miles per hour in approximately four seconds.

The present invention may use batteries or cells made of lithium-ion cells 18. In particular, one embodiment uses Commodity 18650 form factor lithium-ion cells 18 for the electric vehicle. The battery pack 12 in the present invention stores the chemical energy equivalent of approximately two gallons of gasoline. The battery pack 12 operates at a nominal 375 volts and delivers approximately 240 horsepower to the motor. This energy and power capability of the battery pack 12 may allow for the battery pack design and architecture to have many features that ensure the safety of the vehicle and its occupants during use of the electric vehicle. It should be noted that the lithium-ion cells 18 are rechargeable such that after recharging, the batteries will be able to provide traction power for the vehicle based on a fully recharged and capable battery. The energy storage system 12 in one contemplated embodiment comprises 6,831 individual lithium-ion 18650 cells 18 that will allow for it to achieve the drive power and range necessary for the vehicle. These cells 18 are electrically connected in parallel groups of sixty nine cells 18 wherein each of these groups of sixty nine cells 18 constitutes an electrical module called a brick.

The bricks are then connected in series within individual battery modules in the energy storage system called sheets 14. Each sheet or battery module 14 is a single mechanical assembly and consists of nine bricks electrically connected in series. It should be noted that it is contemplated that the sheets 14 may be the smallest replacement unit within the energy storage system 12 and that each sheet 14 generally has a nominal voltage of approximately thirty five volts DC. Furthermore, each of these sheets 14 contain a mechanical mounting system, battery monitoring hardware electronics, and a thermal management system or cooling system according to the present invention as well as various safety systems to ensure proper protection for the vehicle and occupants of such vehicle. In the embodiment contemplated, eleven sheets 14 may be used in total to bring approximately 375 nominal volts DC to the energy storage system for use in the electric vehicle. Each of these sheets 14 will be rigidly mounted within an ESS enclosure 20 and electrically connected to one another in series. It should be noted that the ESS 12 contemplated and shown in the present invention may be adjusted by either increasing or decreasing the number of sheets 14 and/or boards within the ESS 12. The energy storage system 12 may also include a battery monitor board 22, wherein the battery monitor board 22 is associated with each sheet 14 of the energy storage system. The battery monitor board 22 monitors the voltage levels, temperatures and other parameters of all of the bricks within each sheet 14.

Due to the high power output of the energy storage system 12 the individual cells 18 that comprise the ESS 12 must be thermally managed. This arrangement will increase and maximize the longevity of the energy storage system 12. The cells 18 within the ESS 12 of the present invention may exhibit positive feedback thermal characteristics above a certain temperature which may result in failure of the individual cells 18 and the entire energy storage system. The methodology and mode of which this failure may depend has many factors but it is critical that these factors be monitored at all times during use of the battery pack 12 within the electric vehicle of the present invention. There is always the potential for propagation of an individual cell 18 that has overheated into nearby and adjacent cells 18 such that the energy storage system 12 must be closely monitored and controlled to prevent such thermal runaway of any single cell 18, prevent thermal runaway of the cells 18 adjacent to either radially, axially or near by such that a cell 18 that has gone into thermal runaway or propagation may be slowed such that the rate of propagation to other cells 18 within the energy storage system 12 may be completely stopped or slowed such that destruction of the energy storage system 12 and associated cells 18 will not occur. It should be noted that all elements within the energy storage system 12 of the present invention have been designed to remove heat, redistribute heat from within the mass of the energy storage system 12 in order to achieve the prevention or slowing down of the rate of propagation of an overheated cell 18 within the energy storage system 12.

It should be noted that the potential for thermal runaway and propagation of a cell 18 within the battery pack 12 of the present invention is a function that increases with the temperature of any of the individual cells 18. The design of the present system 10 for mitigation of such propagation of thermal runaway events will monitor many specific and general sources of heat that may raise the temperature of the cells 18. Hence, the energy storage system 12 may have a variety of sensors for directly measuring components states, such as but not limited to temperature, voltage, and ambient conditions within the enclosure 20 and that these measurements are then used by hardware and software to make intelligent decisions to control the temperature of the energy storage system 12 so that it stays within an acceptable operating range. The energy storage system 12 may also function to take action in the event that one of the cells 18 or one portion of the energy storage system 12 is forced out of this desired operating temperature range to ensure that the ESS 12 stays within the desired operating range and that the cells 18 stay within their maximized operating range. Therefore, the energy storage system 12 includes the present invention of a system 10 of mitigating propagation of a thermal runaway event such that the system 10 of the present invention will control the temperature of the ESS 12 in both small scale and at the system level.

The energy storage system 12 has many possible sources of heat that may be a possible source of thermal runaway events within the energy storage system 12. The source of heat may be internal and/or external heat sources when compared to the energy storage system 12 as a whole. One such internal heat source is internal cell 18 heating that occurs when one cell 18 has a high rate of discharge. This high rate of discharge may occur when the vehicle is under heavy acceleration and/or driving up a hill, etc. This type of internal heat is considered a part of normal operation of the vehicle, but is monitored for exceptional circumstances that may occur during extremely hot weather or other predetermined or unforeseen circumstances. The heat produced by such high rate of discharge of a cell 18 is generally a function of electric current and the cells internal resistance. Furthermore, a short circuit that is internal to the energy storage system 12 may also cause the cells 18 to heat up when the cells 18 experience a high rate of discharge. The short circuit generally is not part of the normal operation. It should be noted that every cell 18 in the energy storage system 12 is electrically connected by a fuse on both sides of the cell 18 wherein when the current for an individual cell 18 exceeds the fuse current the connection is broken and the circuit is stopped or opened. However, because the short circuit may be internal to the cell 18, the cell 18 may continue to heat into thermal runaway and possibly propagate to adjacent cells 18 there around. It should be noted that the fuses current rating is dependent on the pack design in that the rating is above peak operating currents but significantly below the current of a short circuit scenario. The cells 18 may also heat as a result of high voltage. The cells 18 generally are more sensitive to high temperatures when the cell voltage is high. This volatility is dependent on cell chemistry and varies among the different types of cells contemplated for use. The cells 18 in the energy storage system 12 could be overcharged by the vehicles battery charging system (EVSE) or by the regenerative braking found in the electric vehicle of the present invention. It should also be noted that cells 18 may have suffered internal damage and as such may produce heat from internal chemical reactions. This damage may be caused by impact, crushing or heating to temperatures above the thermal runaway threshold of the individual cells 18.

A high resistant electrical connection may also produce heat by dissipating the energy that passes through it, by proximity this may also heat a nearby cell 18 thus leading to thermal runaway and propagation of such overheated cells. The high resistance connection may be either internal/external to an individual cell 18. It should further be noted that external arcing may occur anywhere within the energy storage system 12 and may produce intense heat in the path of the arc. This arcing could happen if two sheets 14 are short circuited in a crash or during any other known arcing phenomenon. It should also be noted that the cells 18 generally have a target operating temperature of approximately 25° C. It should be noted that this temperature reading depends on the system design and chemistry involved in the cells within the electric vehicle. Therefore, any known target operating temperature of anywhere between −50° C. and 200° C. is contemplated for the present invention. When the external environment of the energy storage system 12 and associated battery pack and cells exceeds this temperature the energy storage system 12 must actively remove this heat from the system 12 to maintain safe and efficient operating temperatures. It is also contemplated that added heat to the ESS 12 may result from a number of unpredicted circumstances and events such as but not limited to a house fire, catastrophic accident, natural disasters and the like.

Therefore, as the system 10 monitors and looks for sources of heat within the ESS 12, the ESS 12 also operates to control the temperature of its system. This temperature control is synonymous with propagation control since the high temperature that enables and sustains a thermal runaway event within a multi-cell battery pack 12 cannot occur if the temperature is properly controlled within the ESS 12. Therefore, the management of heat and heat transfer also may play a role along with cooling and coolant transfer within the system 10 of mitigation of a thermal runaway event of the present invention.

Generally, the first level of temperature control of the mitigation system 10 of the present invention is that the ESS 12 may provide thermal mass in strategic locations and quantities to thermally balance the system 12 and mitigate the occurrence of extreme localized temperatures which may cause a cell 18 thermal runaway within the ESS 12. The ESS 12 has three primary sources of thermal mass for the distinct purpose of distributing heat in the area of the cells 18 within each of the sheets 14 of the ESS 12. One such source is a potting compound 24 which will hold the cells 18 in place with the electrically insulating and thermally conductive potting compound 24. In one contemplated embodiment this potting compound 24 may physically glue the cells 18 in place within each of the sheets 14 of the energy storage system 12. Therefore, when heat is generated locally by an individual cell 18 or group of cells 18 within the energy storage system 12, the potting compound 24 may act as a sink to distribute the heat throughout the entire sheet 14 within which the overheating cell 18 or cells 18 are located. It should be noted that the thermally conductive compound 24 may be used to fill the space between the cells 18 in the battery pack 12. The efficacy of the heat distribution of the potting compound 24 is a function of the physical mass, the thermal mass and the thermal conductivity of the potting compound 24. This principle will apply to the ESS 12 configuration with a different number of cells and that is described or disclosed herein.

Another source of temperature control will be the use of cooling tubes 26 within the energy storage system 12. In one contemplated embodiment aluminum cooling tubes 26 are arranged into each of the sheets 14 with the potting compound 24 such that the cooling tubes 26 are adjacent to each and every cell 18 within each sheet 14. It should be noted that aluminum is one of the contemplated materials for use as a cooling tube 26, however any other known metal, ceramic, composite, plastic, natural material or the like may also be used for the cooling tubes 26. In one contemplated embodiment the cooling tubes 26 may be glued into each sheet 14 with the potting compound 24. The cooling tube 26 may be made out of different materials and have a variety of geometries to achieve the best thermal balance between the cells 18 wherein a material is chosen based on the combined effects of the thermal mass, thermal conductivity, manufacturability and electrically properties thereof. In the case of the electrically conductive aluminum cooling tube 26 the entire assembly is assembled to be electrically insulated from the cells 18. Generally a coolant will be arranged within the inner bore of the coolant tube 26 of the present invention. One type of coolant that may be used for the present invention may include propylene glycol and/or ethylene glycol, which usually are mixed with 50% or more water in many applications. In the ESS 12, the aluminum cooling tubes 26 may be filled with such coolant such that the coolant is generally connected to the cells 18 via the cooling tube 26 and the potting compound 24. Thermal mass of the coolant is significant to the sheets 14 capacity to dissipate heat in the present invention of a mitigation of thermal runaway event therein. Applicant also has a copending Application Titled "Battery Pack Thermal Management System" filed Jul. 18, 2007 having Application Ser. No. 11/779,583, which is hereby incorporated by reference.

The system of mitigation 10 also includes collector plates 28 arranged on each end of the cells 18 within the ESS 12. The collector plates 28 which connect the cells 18 electrically also provide a secondary thermal sink for the ESS 12. The collector plates 28 have substantial thermal mass but have a relatively weak thermal connection to the cells 18. These plates 28 generally are made of a highly conductive material, such as copper and aluminum alloys and cover the top and bottom surface of each sheet 14 in the ESS 12. These collector plates 28 may also reflect radiant heat within the energy storage system 12. It should be noted that the collector plates 28 may be of any known size, thickness and shape, include orifices therein and may be made of any known material such as metal, ceramic, composites, or any known natural material or plastic.

The mitigation system 10 of the present invention has an active cooling system in the ESS 12 that includes the vehicles heating, ventilation and air conditioning system (HVAC) 30 that removes heat from the pumped coolant, which removes heat from the cells 18 of the ESS 12 over a temperature gradient between the cells 18 and the cooling tube 26. By actively removing heat from the sheets 14 of cells 18, the mitigation system 10 may protect the cells 18 from thermal runaway events and failures. It should be noted that the HVAC pump 30 generally provides coolant circulation and heat distribution to reduce gradients across the vehicles cooling system. The pumped coolant is distributed to the channels 32 in each of the cooling tubes 26 via a manifold of a thermal management system. The cooling tube 26 of the present invention may have multiple channels 32 with cross flowing coolant to keep the temperature uniform along the length of the cooling tube 26 thus keeping the temperature of the adjacent cells 18 uniform such that a zero gradient is formed. It should be noted that the cooling system may be turned on in all failure modes whenever twelve volts is available to operate the HVAC system 30 including times when power is drawn from an external source and not the battery pack or energy storage system 12 of the present invention or A/C motor of the vehicle. The coolant is pumped and cooled through a single HVAC unit 30 in one contemplated embodiment, however it is contemplated to use a dual HVAC unit system within the electric vehicle of the present invention. The coolant is distributed among the sheets 14 in the ESS 12 so as to provide even cooling to the entire system. The manifold is designed to equalize pressure drops and to maintain a counter flow of coolant through the sheets cooling tubes 26.

It is also contemplated that when required, especially at low temperatures, the HVAC system 30 may be capable of adding heat to the energy storage system 12 through the same pathways that remove heat in the active cooling mode. This is essential for maintaining the integrity of the cells 18 during normal operation of the electric vehicle.

Passive thermal control is also part of the mitigation system 10 in that the cells 18 in the ESS 12 have a predetermined geometry. In one contemplated embodiment the geometry of the cells 18 is that of a cylindrical shape. This cylindrical shape allows for a predetermined packing efficiency such that the cells 18 may be packed such that they are touching on every face, thus enabling the battery packs 14 to be the smallest configuration possible. In the event that a single cell 18 in such a small configuration may enter into thermal runaway, the heat produced by that one overheated cell 18 may transfer to the adjacent cells 18 and raise their temperatures to a point of propagation of the thermal event throughout the entire battery pack and ESS 12 of the electric vehicle. Therefore, the cells 18 of the present invention are arranged in a predetermined array and space such that the geometry of concern is the closeness of the surrounding cells 18 in all dimensions relative to any single cell 18 within that same array. Therefore, from the perspective of such a single cell in thermal runaway the cells 18 would be ideally packed very far apart from each other so that any heat from such individual cell 18 in thermal runaway would not be able to be transferred to the other cells 18 within the energy storage system 13. Thus, the combination of geometric spacing and thermal properties of the surrounding materials is engineered in the present invention to optimize for best propagation prevention, the lowest weight for the entire energy storage system 12 and the most reasonable and smallest packing efficiency for use in the electric vehicle. Therefore, transverse packing of the cells 18 and the associated spacing is optimized in the present invention. This transverse packing may refer to the cells 18 as they are packed in one of the eleven sheets 14 in the energy storage system 12. A thermally conductive potting compound 24 enables quicker heat distribution among the cells 18 so that the cells 18 can be closer together than if they were separated by air alone. The orientation of the cells 18 transversely with relation to one another as shown in FIG. 5. The cell 18 spacing also optimizes the axial packing such that the distance between the end of the cells 18 as the sheets are packed into the ESS 12 enclosure is optimized. In this case the cells 18 generally are effectively placed end to end throughout the energy storage system 12. FIG. 6 shows the cells oriented axially relative to one another. This cell 18 spacing both axially and transversely would produce the most efficient packing of the cells being placed directly end to end. However, the actual spacing, i.e., the spacing between sheets within the energy storage system 12 is dependent on electrical isolation, protected layers needed in between such sheets 14 and the thermal properties of the separating media between the sheets 14 of the energy storage system 12.

Temperature control is also afforded to the mitigation system 10 via high temperature barricades. These high temperature barricades generally are sheet insulators 32 made of materials that provide physical heat barriers to contain propagation between sheets 14 within the ESS 12. One type of material generally is a plastic material, such as Nomex, however any other type of insulating material may also be used. Generally, the collector plates 28 also serve this function of creating a physical heat barrier between propagation between sheets 14 within the ESS 12. In the event of a cell 18 in thermal runaway, flames may be ejected from the positive end of the cell 18 in thermal runaway, thus causing propagation to a neighboring cell 18 in another sheet 14 of the ESS 12. These high temperature barricades such as the sheet insulators 32 and the collector plates 28 may provide a barricade to block this flame from affecting adjacent modules or sheets 14 within the energy storage system 12. Furthermore, in the event of an internal failure such a barricade 32 may protect the external environment from internally generating more heat thus propagating the thermal runaway within the ESS 12.

In the event thermal runaway does affect one cell 18 within the ESS 12, heat and fumes may be vented from the ESS enclosure 20 via a valve membrane or shunt 34. The release of the heat that occurs when the cell 18 enters thermal runaway will keep the ESS 12 internal temperature from rising while also the evacuation of flammable fumes will reduce the risk of generating additional heat from the combustion of those fumes. It should also be noted that all potentially flammable substances within the ESS 12 may be made of self extinguishing materials such that in the presence of high heat these materials will not release more heat from combustion thus propagating the thermal runaway event within the ESS 12. The use of self extinguishing materials will especially apply to plastics, rubber and fiber products found in insulators, connectors and coatings and other components within the energy storage system 12.

The temperature control of the ESS 12 may occur in any or all of the above described temperature control methodologies or components may be activated by the vehicle management system 36 which is an onboard computer that monitors, controls and coordinates various systems in the electric vehicle including but not limited to the power electronics module 38, the energy storage system 12, the HVAC 30 and the user interface. The power electronics module 38 is a sister module to the ESS 12 that may house a DC/AC inverter for the traction motor, an AC/DC rectifier for charging and the control PCB for drive and charge. The heating and ventilation and air conditioning unit 30 may receive high power voltage from the ESS 12 via a connector. Although there are no HVAC components 30 inside the ESS enclosure 20, the HVAC controller 30 receives its high voltage from the energy storage system 12. The mitigation system 10 also may include a battery monitor board 22 that is a voltage and temperature monitoring printed circuit board that is integrated into each sheet 14 of the ESS 12. The system 10 may also include a battery safety monitor 40 that is a watch dog computer in the ESS 12 that will communicate with the vehicle management system 36 and take action due to faults of changing voltage, temperature and current conditions as well as disconnected outputs. The system 10 also may include an axially power supply 16 that provides twelve volt power to the vehicle, wherein the auxiliary power supply 16 is located inside the energy storage system 12 and connects to the rest of the vehicle through a twelve volt connector 42. The vehicle also may have a controller area network bus 44 that uses communication protocol generally used by many in the auto industry. The protocol is intended for embedded systems and is designed for real time performance within the electric vehicle. It should further be noted that a clam shell member may locate and encase all of the cells 18 in a sheet 14 and that two clam shell members generally form one of the main structural components of one individual sheet 14. Therefore, according to the present mitigation system 10 the active components of the propagation mitigation system depend on an affective measurement of the condition of the ESS 12. These measurements are generally taken from sensors 46 that are arranged throughout the ESS 12 and which are read by internal computers such as but not limited to the BMB 22, BSM 40, VMS 36 and PEM 38 by proxy. Generally, the mitigation system 10 of the present invention may include an inertia switch 48 that is hard mounted to the ESS enclosure 20. When the ESS 12 is subject to a physical shock above a predetermined rated threshold the switch 48 will open thus cutting power to the battery pack 12. The system 10 may also include a roll over switch that will open the ESS contactors 50 when the battery pack 12 is turned upside due to a vehicle collision or other unforeseen event.

A plurality of sensors 46 are arranged throughout the ESS 12 and include but are not limited to an immersion sensor 46 which is arranged over the low internal surfaces of the ESS enclosure 20 where fluids may collect thus sensing fluid collection therein. A humidity sensor 46 may be built directly on the BSM 40 to monitor the internal conditions of the ESS 12. The humidity is an important factor in conjunction with the temperature measurement to determine the dew point of the environment so as to not induce condensation within the energy storage system 12 of the present invention. The mitigation system 10 also may include a smoke sensor 46 that detects combustion products that are released during a thermal runaway event. The placement of the smoke sensors within the ESS 12 may allow for the sensors to be sensitive enough to detect the runaway of a single cell 18 anywhere within the pack 12 in a matter of seconds or milliseconds. The mitigation system 10 also may include an organic vapor sensor that may be used in parallel with the smoke or carbon dioxide sensor to detect combustion products that are missed by other sensors within the ESS 12. It is also contemplated to use the sensor for temperature sensitive compounds in order to detect temperature sensitive compounds that would create an organic vapor when a cell 18 is in thermal runaway. Heated components may be coated with the material that releases a known detectable gas, mist, smoke or the like when the temperature of the coating exceeds a predetermined or predefined safety threshold on the component on which the material is coated thereon.

Furthermore, each sheet 14 in the ESS 12 may contain a plurality of thermistors in one contemplated embodiment six thermistors may be attached directly to the cells 18 and are measured and monitored by the BMB 22 of each of the individual sheets 14. These thermistors will be attached to specific cells 18 which represent the adjacent cells 18 in terms of temperature measurement. These represented cells 18 may be chosen based on their proximity of potential failure points and are distributed among different bricks within the pack. Furthermore, each of the sheets 14 is divided into groups of cells known as bricks wherein each of the bricks is wired in parallel. The bricks within a sheet are then connected in series. Each brick within a sheet is connected to the sheets BMB 22 to measure the bricks voltage. Also, the mitigating system 10 may include current sensors 46 at the pack and module levels that will provide information about the instantaneous electrical use of the overall system. Because internal heat generation is typically a function of the square of current draw, current sensors 46 are critical to the present invention for detecting problems that result in high temperatures.

It should also be noted that fuses 52 are arranged throughout the ESS 12 at the pack level, at the module level and twice at the cell level. These fuses 52 in theory are both sensors and actuators. They will break the connection upon sensing an over current condition. For protecting against over current situations the ESS 12 is again prevented from generating excess heat during unusual events for which the fuses 52 are designed to counteract.

Electronics within the ESS 12 may be programmed to take actions based on the conditions met by state of the ESS 12 defined by a single measurement or combination of measurements as described above. Some of these actions may be performed directly by the BMBs 22 at the sheet 14 level while others are made in the form of messages to the BSM 40 or VSM 36 which in turn take action via other components in the ESS 12 or vehicle to counteract such detected overheating of a cell 18, ESS 12 or the like.

One such action on detection is a voltage balancing mechanism between cells 18 of the ESS 12. Generally, cells 18 within a sheet 14 may discharge unevenly, making one brick have a different voltage from other bricks in the ESS 12. The BMBs 22 will communicate this information over the CAN 44 network and constantly drain energy from the higher voltage bricks in the pack 12 to the much lower voltage bricks. This energy may be expelled as heat, or in a more complex system the low voltage bricks may effectively be charged internally and high voltage bricks are discharged to balance the voltage of the entire pack to a stable uniform level. Such voltage balancing occurs as the voltage is monitored over all of the cells continuously by the BSM 40 via the BMBs 22. The charging and braking systems use the BSMs 40 measurement to keep the cell 18 voltages in a safe and predetermined working range.

It should be noted that if any brick in the battery pack 12 is higher than a predefined voltage or if the overall voltage of the battery pack 12 is above or greater than another predefined voltage the BMBs 22 will send a message to the BSM 40 to open the contactors 50 of the battery pack 12 thus disabling any current from flowing into or out of the ESS 12. Furthermore, the ESS 12 may open its contactors 50 if the battery pack or cell voltages fall below a predetermined low voltage value for the system. It should also be noted that the contactors 50 may open if any measured temperature is over a predetermined value. The electronics may also analyze the temperatures of the array of thermistors to determine if there is likely a higher temperature cell nearby that is not directly measured. In this case it would also shut off the pack by opening the contactors 50 thus stopping a potential or actual thermal runaway event from propagating.

An under temperature shut off may also occur for the ESS 12 when the temperature of the ESS 12 or associated cells 18 falls below a predetermined lower threshold. The contactors 50 of the ESS 12 may also open and shut off the ESS 12 if the current draw from the pack exceeds a predetermined safety limit. This function is redundant with the fuse protection but also may be used in cases where any current is drawn while the ESS 12 is in an unexpected state.

It should also be noted that in some cases such as when the vehicle is parked or not operating under normal driving conditions the HVAC system 30 is then not expected to operate as it would under normal driving conditions. The electronics and the associated ESS software may turn on the HVAC pump 30 to distribute heat throughout the system if the temperatures are rising due to external effects. The pump may also be turned on if the smoke sensor is triggered thus distributing heat before a problem is detected by the temperature sensors or other sensors within the ESS enclosure 20. The electronics of the mitigation system 10 also may send error messages to the vehicle management system 36 when an error occurs thus notifying the driver of such error. In the event of a serious error messages may also be sent to an external server to notify agencies and personnel of the vehicle manufacturer so problem solving and prevention of failures in the future may also occur.

The cells 18 of the ESS 12 may also include predetermined internal safety features such as a positive thermal coefficient fuse, wherein each cell 18 in the ESS 12 may contain a fuse that disconnects the circuit in the event that the temperature exceeds a safety threshold. This temperature threshold will correspond to an energy that is below the activation energy that would start an exergonic reaction within the cell 18. This positive thermal coefficient fuse may act to prevent thermal runaway in individual cells 18. Each cell 18 may also contain a current interruption device within the ESS 12 that would disconnect the circuit when the internal pressure of the cell 18 exceeds a safety threshold. Such pressure increases are likely when the cells are overheated or over charged during operation.

It should be noted that other propagation controls are contemplated for use in the present invention. One such control may be the use of small orifices in the collector plates 28 to keep any flames from an overheating cell 18 from exiting and entering the area next to the cell 18. Furthermore, wire bonds used to connect the cell 18 to the collector plates 28 may melt during thermal runaway which disarms the current path of the cells 18 in thermal runaway. It is also contemplated to use phase change materials in the potting compound to absorb energy from the heated cells and to even use cooling tubes that may include plastics that will melt at a predetermined temperature above a failure mode below total thermal runaway. The tube 26 will then leak where the plastic is and remove heat from nearby cells 18 by direct contact with the coolant. It is also contemplated to use a fan to cool and move the air within the ESS 12 and maintain a uniform temperature therein. It is also contemplated to use the HVAC pump 30 in an always on manner during charging, as generally most failures happen during charging of the ESS 12. It is also contemplated to use fiberglass above the potting line to limit heat transfer to only conduction and limit areas to potting to restrict heat conduction to certain paths. It should be noted that the cooling pump 30 is a significant active safety mechanism in that it operates as long as there is twelve volts available. Furthermore, even without the heat removal of the HVAC system 30, moving the fluid through the vehicle helps distribute the heat evenly within the system. It also should be noted that the battery pack 12 will not charge at temperatures below 0° C. though it will still allow the vehicle to drive in conditions as low as −20° C. To preserve chemical integrity the cells 18 must be heated above approximately 0° C. to 5° C. before charging will begin, once the ESS 12 has fallen below 0° C.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A method of mitigating propagation of a thermal event in an energy storage system having a plurality of cells, said method including the steps of:
   identifying a heat source within the energy storage system and plurality of cells;
   controlling a temperature of the energy storage system and plurality of cells;
   detecting predetermined conditions of the energy storage system; and
   performing a predetermined action when one of said predetermined conditions is detected.

2. The method of claim 1 wherein said step of identifying includes determining if a high rate of discharge is occurring in one of said cells or if a short circuit has occurred within the energy storage system.

3. The method of claim 1 wherein said step of identifying includes determining if one of the cells has a high voltage, has suffered internal damage and is producing excess heat, or a high resistance connection is detected between cells or in the energy storage system.

4. The method of claim 1 wherein said step of identifying includes determining if an electrical arc is occurring within the energy storage system, if an ambient temperature is higher than a predetermined level, or other predetermined heat sources are effecting the energy storage system.

5. The method of claim 1 wherein said step of controlling includes using thermal mass in predetermined locations and in predetermined quantities to thermally balance the energy storage system.

6. The method of claim 5 wherein said thermal mass includes an electrically insulated and thermally conductive material arranged around at least a portion of the cells, a cooling tube adjacent to the cells, said cooling tube having a coolant therein, and collector plates arranged at each end of the cells.

7. The method of claim 6 wherein said collector plates are made of metal and reflect radiant heat inside the energy storage system.

8. The method of claim 1 wherein said controlling step includes using cylindrical shaped cells arranged in a predetermined shaped array, said array have the cells with a predetermined transverse and axial spacing therebetween and with respect to corners and edges of the energy storage system.

9. The method of claim 7 wherein said controlling step includes arranging insulators adjacent to said collector plates to form a heat barrier between sheets of cells in the energy storage system, said insulator is made of a fire resistant material.

10. The method of claim 6 wherein at least a portion of said cooling tube is made of a low melting temperature material to allow a coolant to flood or saturate a cell in thermal runaway.

11. The method of claim 1 wherein said step of controlling includes venting fumes and heat from the energy storage system via a valve or membrane and using self extinguishing materials in the energy storage system.

12. The method of claim 1 wherein said step of detecting includes monitoring inertia of the electric storage system, roll over of the electric storage system or immersion of the energy storage system in a fluid.

13. The method of claim 1 wherein said step of detecting includes monitoring humidity of the energy storage system or if smoke, organic vapor, gas or mist is present in the energy storage system.

14. The method of claim 1 wherein the step of detecting includes monitoring temperatures, voltage of individual bricks, current in the energy storage system and fuses arranged at predetermined positions within the energy storage system.

15. The method of claim 1 wherein said step of performing an action includes balancing and monitoring voltage in the cells, opening contactors of the energy storage system if an over voltage, under voltage, over temperature, under temperature or over current condition occurs.

16. The method of claim 1 wherein said step of performing an action includes operating a HVAC pump to distribute heat in the energy storage system and sending errors to a vehicle management system or a server.

17. The method of claim 1 further including a step of incorporating a positive thermal coefficient fuse and current interrupt device into the cell.

18. An apparatus for mitigating the propagation of a thermal event in an energy storage system for use in a vehicle, said apparatus including:
   a vehicle management system located on an onboard computer of the vehicle;
   a battery safety monitor in communication with said vehicle management system;
   a plurality of battery monitor boards associated with a sheet of a predetermined number of cells of the energy storage system, said battery monitor boards in communication with said vehicle management system and said battery safety monitor;
   a power electronics module in communication with said battery safety monitor; and
   a heating ventilation and air conditioning unit in communication with said battery safety monitor and said vehicle management system.

19. The apparatus of claim 18 further including an electronically insulating and thermally conductive material arranged around said cells and a cooling tube adjacent to every cell to control a temperature of said cells.

20. The apparatus of claim 19 wherein said cooling tube is filled with a coolant and said cells are arranged between collector plates, said collector plates provide a thermal sink for the energy storage system.

21. The apparatus of claim 20 wherein said heating and air conditioning unit is in fluid communication with said cooling tube to provide active cooling or heating to said cells.

22. The apparatus of claim 18 wherein said cells have a cylindrical shape and are arranged in a predetermined shaped array with predetermined axial and transverse spacing therebetween to provide passive heating and cooling to said cells.

23. The apparatus of claim 18 further including an insulator arranged adjacent to at least one end of said cells.

24. The apparatus of claim 18 further including a valve or other bidirectional transfer device arranged on a surface of an enclosure of an energy storage system to provide a venting pathway for heat and fumes during a thermal event.

25. The apparatus of claim 18 further including self extinguishable materials within the energy storage system.

26. The apparatus of claim 18 further including a plurality of sensors in communication with said battery safety monitor.

27. The apparatus of claim 26 wherein said sensors monitor immersion, humidity, smoke, organic vapors, current, and temperature sensitive compounds within and adjacent to the energy storage system.

28. The apparatus of claim 18 further including an inertia switch and rollover switch.

29. The apparatus of claim 18 further including a thermistor arranged on each sheet and in communication with said battery monitoring board.

30. The apparatus of claim 18 further including a plurality of fuses arranged throughout the energy storage system to protect against over current conditions and the associated heat.

31. The apparatus of claim 18 wherein said battery monitoring boards communicate with each other to balance voltage of said cells.

32. The apparatus of claim 18 further including contactors, said contactors are opened when an over voltage, under voltage, over temperature, under temperature or over current is detected.

33. The apparatus of claim 18 wherein said cells having a positive thermal coefficient fuse and a current interrupt device.

34. The apparatus of claim 18 wherein an error message is sent to said vehicle management system and an external server to notify of problems with the energy storage system.

35. The apparatus of claim 18 wherein said heating ventilation and air conditioning unit operates during non normal driving conditions to provide extra cooling to the energy storage system.

* * * * *